United States Patent [19]

Dallavia, Jr. et al.

[11] Patent Number: 4,876,291

[45] Date of Patent: Oct. 24, 1989

[54] MINERAL FILLER FIRE RETARDANT COMPOSITION AND METHOD

[75] Inventors: Anthony J. Dallavia, Jr., Marietta; Susan Vande Ven, Marietta; Bobby E. Smith, Ranger, all of Ga.

[73] Assignee: J.M. Huber Corporation, Rumson, N.J.

[21] Appl. No.: 354,532

[22] Filed: May 19, 1989

Related U.S. Application Data

[62] Division of Ser. No. 236,064, Aug. 24, 1988.

[51] Int. Cl.$^4$ ............................. C08K 9/00; C08J 9/04
[52] U.S. Cl. ................................ 521/124; 428/407; 521/76; 521/92; 521/138; 521/906; 521/907; 523/179; 523/200; 523/205; 524/157; 524/159; 524/169; 524/392
[58] Field of Search ............... 428/407; 521/76, 92, 521/124, 138, 906, 907; 523/179, 200, 205; 524/157, 159, 169, 392

[56] References Cited

U.S. PATENT DOCUMENTS

| | | |
|---|---|---|
| 3,368,996 | 2/1968 | Beacham et al. |
| 3,677,999 | 7/1972 | Denk et al. |
| 3,865,760 | 2/1975 | Pitts et al. |
| 3,897,372 | 7/1975 | Kehr et al. |
| 4,159,977 | 7/1979 | Hsieh |
| 4,165,118 | 8/1979 | Marans et al. |
| 4,224,374 | 9/1980 | Priest |
| 4,233,204 | 11/1980 | Rubel |
| 4,279,953 | 7/1981 | Barden et al. |
| 4,315,075 | 2/1982 | Gardner |
| 4,340,579 | 7/1982 | Greber et al. |
| 4,373,039 | 2/1983 | Mueller et al. |
| 4,407,768 | 10/1983 | Garcia et al. |
| 4,547,526 | 10/1985 | Al-Tabaqchali et al. |

Primary Examiner—Morton Foelak
Attorney, Agent, or Firm—Alec H. Horn; Harold H. Flanders; Robert L. Price

[57] ABSTRACT

An improved mineral filler fire retardant composition and method are provided wherein the filler is surface treated with a polyfunctional isocyanate. This surface treatment reacts to form a polymeric coating thereby reducing both the free moisture and soluble soda level. This improved filler results in superior physical properties in polymer resins and improved processing characteristics in urethane foams.

15 Claims, No Drawings

MINERAL FILLER FIRE RETARDANT COMPOSITION AND METHOD

This application is a division of application Ser. No. 07,236,064, filed Aug. 24, 1988.

FIELD OF THE INVENTION

This invention relates to particulate fillers for imparting flame retardancy and, more particularly, to water releasing particulate fillers suitable for imparting flame retardancy in polymeric resins.

BACKGROUND OF THE INVENTION

Because of the natural flammability of organic polymer resins, it is common practice to incorporate a flame retardant into the formulation of a resin based composition or system in order to improve the safety of the final product.

A common approach to flame resistance is to incorporate into the resin certain flame inhibiting hydrated minerals, such as alumina trihydrate (ATH). When compounded into resins at sufficient levels, these hydrated minerals impart both flame and smoke retardancy by evolving non-toxic gases, such as water, to dilute the combustion products and to promote char formation. Although these hydrated minerals have met with much success as flame retardants, certain problems exist.

Because of the technique used in the production of crude alumina trihydrate, particulate fillers made from this material contains varying amounts of basic alkali metal salts. These alkali metal salts form sites of basic salt concentrations on the surface which are conventionally known as "hot spots". These hot spots, or active sites, are well known to cause problems in various resin matrix systems. Surface activity promotes the absorption of water by filled resins such that the electrical properties of the resins are adversely effected. Another problem attributed to surface activity, and discussed in more detail below, is the adverse effect on polyurethane foam manufacture as, for example, in carpet backing manufacture.

In urethane foam, these "hot spots" or active sites are known to interfere with the rate of reaction of the urethane precursors. These reaction rates vary from time to time making precise prediction of urethane cure rate very difficult. Second, the presence of these active sites on the filler surface can promote excessive foaming during the urethane reaction.

One way to combat surface activity is to vigorously water wash the ground ATH until the amount of basic salts, expressed as percent titratable soluble soda ($Na_2O$), is greatly reduced. This technique, though effective, is very expensive and is not economically feasible.

A second technique is to carefully monitor the soluble soda levels on the filler and use only low soda crude. However, this approach severely limits sources of feedstock and may result in production of large quantities of unacceptable flame retardant. A third technique is aging the ground flame retardant. Some believe that aging the filler for up to a week prior to use can reduce surface activity. This approach requires excessive inventory storage demands and is often ineffective.

In the case of urethane foam manufacture, one of the more preferred techniques for combating surface activity is to use a less active catalyst in the urethane reaction to slow down the process to the point that variation is more easily handled. Although slowing down the reaction rate makes the problem easier to handle, it does not solve the problem itself and result in significant variations in production working time. Because of this variation, work must be done in smaller or less efficient batches, there is greater scrap resulting from premature setup, lumping can occur because of different reaction rates throughout the batch, the process is resistant to automation, and machines must run slower to permit constant adjustment for the less predictable reaction time.

Coupled with all of the above techniques is the practice of using a filler flame retardant having as large a particle size, and hence the least surface area, as practical. However, high loading level of relatively large filler in a matrix significantly degrades certain physical properties of the composite and thus fine particle size hydrated fillers are preferred.

These and other disadvantages of the prior art hydrated mineral flame retardants are overcome by the novel composition and method disclosed herein.

SUMMARY OF THE INVENTION

In accordance with the present invention, there is provided, in one embodiment of the invention, a particulate fire retardant composition comprising a mineral filler and a polymeric material. The mineral filler is a basic, hydrated, particulate mineral filler capable of evolving water at a temperature above 200° C. The polymeric material is formed from a polyfunctional isocyanate and is present in an amount sufficient to coat the mineral filler. In addition, the mineral filler contains an initiator in an amount sufficient to effect polymerization of the polyfunctional isocyanate.

In another embodiment of the present invention, a method for forming a particulate fire retardant composition is provided. A particulate of basic, hydrated mineral filler capable of evolving water at a temperature above 200° C. is formed. This particulate filler is admixed with a polyfunctional isocyanate which is present in an amount to form a polymeric material sufficient to coat the filler without substantially agglomerating the filler. This polyfunctional isocyanate and filler are admixed for a period of time sufficient to initiate polymerization of the polyfunctional isocyanate.

In another embodiment of the present invention a flame retarded polyurethane foam is provided wherein the fire retardant composition described above can be admixed with a polyol to form a first mixture. This first mixture is admixed with an isocyanate to produce a polyurethane foam having suspended therein the particulate fire retardant composition described above.

It is an object of the present invention to provide a hydrated mineral filler with reduced surface activity.

It is another object of the present invention to provide a hydrated mineral filler with a reduced free moisture and soluble soda level.

It is a feature of the present invention to provide a hydrated mineral filler which promotes consistent reaction rates, increased working time, increased gel time, and reduced foaming in urethane foam production.

It is an advantage of the present invention to provide a hydrated mineral filler which provides superior physical properties when incorporated into a urethane foam.

It is another feature of the present invention to provide a hydrated mineral filler which, when incorporated into a polymer resin, does not promote the absorption of water.

These and other objects, features and advantages of the invention will become apparent from the following detailed description wherein reference is made to Tables 1 through 5.

DESCRIPTION OF PREFERRED EMBODIMENT

The hydrated mineral flame retardant fillers of the present invention utilize polyfunctional isocyanates. Polyfunctional isocyanates include di, tri or tetraisocyanates or a mono-functional isocyanate used in a mixture with higher functional isocyanates. Common aromatic polyfunctional isocyanates include pure or mixed isomers of toluene diisocyanate (TDI), diphenylmethane diisocyanate (MDI) or polymeric MDI. Common aliphatic or cyclo-aliphatic polyfunctional isocyanates include hexamethylene diisocyanate (HDI) and isophorone diisocyanate (IPDI).

The terms urethane and polyurethane as used herein refer to the reaction product of a polyfunctional isocyanate with a polyol, the reaction products of isocyanates with themselves or the reaction of a polyfunctional isocyanate with any hydrogen donor to produce a polymerized compound. A polyfunctional isocyanate is an isocyanate or mixture of isocyanates having an average functionality greater than one. A polyol is the polymeric reaction product of an organic oxide and a compound containing two or more active hydrogens. For example, polyether polyols are based on propylene oxide terminated with a secondary hydroxyl. Typical polyols used in commercial urethane foam production include 1, 4 butanediol; hydroxy terminated polyethylene oxide and polypropylene oxide.

The hydrated mineral filler compositions of the present invention evolve water at temperatures above 200° C. and includes aluminum trihydrate (ATH) in varying particle sizes from 25 microns ($\mu$m) to 2 microns. These fillers of the present invention receive surface treatments between 0.25 to 5%. As used herein, percentages are given in weight percent of filler unless otherwise indicated.

It has been found that the surface activity of a hydrated filler may be reduced by a surface modification of the hydrated filler prior to introduction of the filler into the matrix. A thin coating of a polyfunctional isocyanate, either alone or in combination with a polyol, results in the formation of a highly cross-linked polyurethane coating on the surface of the filler. The basic salt active sites on the surface of the filler catalyze the urethane reaction to effectively isolate the active site with a thin, multimolecular layer of the highly cross-linked urethane at its locus. Because of the catalytic activity of the active site, the more surface active the filler, the more chemically active the site to promote the cross-linking reaction such that all sites on the surface become completely covered.

After surface treatment of the hydrated filler is completed, the polyurethane coating is chemically bound to the surface of the particle. It is believed that a small excess of unreacted isocyanate groups are then available to chemically attach to the matrix into which the filler is placed. The end result is a hydrated filler in a composite having a chemically bound surface layer which is chemically bound to the matrix to provide a very strong interface. This interfacial bonding can improve physical properties, such as tensile strength, of the final composite. It is another benefit that moisture normally found on the surface of the filler also reacts with the polyfunctional isocyanate and is removed to render the filler hydrophobic.

In order to be effective, the urethane coating on the surface of the filler should be greater than a monolayer but not so great as to promote agglomeration of particles which would decrease the dispersion of the hydrated filler in the desired matrix application. It is believed that a premix coating between 0.25 to 5% by weight is acceptable. In the following examples, samples of ATH particulate flame retardant were made from a single lot of crude feedstock unless otherwise noted in order to eliminate variations in surface activity, expressed as soluble soda ($Na_2O$).

In a preferred embodiment of the method aspect of the present invention, the crude ATH was ground into a powder in a conventional manner and the weight percent of basic alkali metal salts on the surface, expressed as soluble soda ($Na_2O$), was determined by titration against a standard dilute HCl. The ground ATH was mixed in a one-gallon Henschel mixer using a ten minute mix cycle and a selected component added thereto to surface coat the sample. Single component surface treatments were added to the ATH in undiluted liquid form as received. Dual component systems of polyol and polyfunctional isocyanate were blended in a premix in the indicated ratios then added in the premix form. All surface modification components in the following examples were added gradually at the beginning of the mix cycle.

Calcium carbonate was chosen as a control filler because it contains neither soluble surface soda nor significant free moisture. In order to reduce variations in soluble soda originating from the crude, a commercially acceptable, coarse (25 micron) particle size particulate filler was made from a single lot of u crude ATH (Batch 1) to produce a filler with a fairly low and consistent soluble soda and surface moisture. In other examples, filler ATH made from other batches of crude and having a particle size of 18, 10, 8 or 2 $\mu$m were evaluated.

The polyol selected for the following examples was VORANOL ® 9000 polyether polyol, commercially available from Dow Chemical of Midland, Michigan. Polyfunctional isocyanates selected were VORANATE ® T-7000 and T-80, also commercially available from Dow Chemical. T-7000 is a toluene diisocyanate (TDI) prepolymer blend containing about 30% unreacted TDI. T-80 is substantially pure (80%) TDI isomer. Another polyfunctional isocyanate selected was diphenylmethane diisocyanate (MDI) obtained as a mixture of 80% MDI, 20% MDI homopolymer from Dow Chemical and sold under the trademark ISONATE 143L.

In order to describe the features and benefits of the present invention, it is convenient to use as an illustration the process for making the urethane foam used in carpet backing. Carpet back manufacturers often blame unacceptable ATH performance on the free moisture and the surface sodium salt, expressed as soluble soda, of the ATH used. In this process the problems of surface activity of hydrated mineral flame retardant fillers, most notably alumina trihydrate (ATH), are well recognized and common tests and procedures have been developed in the industry to evaluate process changes attributed to free moisture and surface activity. It is understood that the process discussed herein is illustrative only, and that the hydrated filler of the present invention could be effectively utilized in other applications and matrixes where surface activity is a problem.

In the manufacture of polyurethane foams, such as carpet backing, commercial success is tied closely to the performance of the urethane composite components on automated foaming equipment. Basically, a foaming machine comprises several extremely accurate pumps used to deliver the components to a mixing chamber at varying pressures and flow rates. A typical system has provisions for recycling material to the storage tanks and is equipped with a solvent flushing system for cleaning. Heat exchangers are used to heat or cool the reactants to the desired temperatures.

Two storage tanks are provided to hold reagents. In one tank is an isocyanate or a prepolymer or adduct of an isocyanate. In the other tank is a mixture of polyol, blowing agent, catalyst and mineral filler fire retardant blended together in a premix. This premix is sometimes referred to as the "master batch" or "B" side. When the contents of the two storage tanks are properly blended together along with additional catalysts, a reaction occurs and a polyurethane foam is produced. Thereafter, the foam is applied to a carpet, shaped and automatically passed through an oven to cure.

The amount of time between the beginning of the foam pour and the point at which the foam reaches 120°0 C. is referred to as "production working time" or cell time. Before the end of this period the carpet backing must be applied to the carpet and ready for the curing oven. Because of the complex equipment interrelation with the progress of the reaction, this measurement is not readily determined with accuracy in the laboratory.

As a way of determining if a particular hydrated filler is acceptable in this process, a more simple measure, called gel time, has been developed which is a function of production working time. Gel time is the amount of time required for a reaction mixture to reach a viscosity of 20,000 cps. A gel time of 10 to 13 minutes with a foam rise less than or equal
to $\frac{3}{4}''$ indicates a flame retardant filler which will perform adequately in production equipment.

Using the preferred method described earlier, a series of surface modified ATH flame retardants were prepared and the following test procedure was used to evaluate surface activity of all examples. 100 gms of a polyether polyol (VORANOL ® 9000) is added to a 9 oz. paper cup and 50 grams of flame retardant filler to be evaluated is blended with a tongue depressor for one minute to simulate the way the product is made in industry. 42.5 grams of an isocyante prepolymer (VORANATE ® 7000 is added and blended for one minute. Immediately thereafter .3 cc of catalyst (a dialkyl tin carboxylate commercially available from Dow chemical as FOMREA UL-6) is added and a timer started. The catalyst is blended for thirty seconds and the initial surface level is marked on the measuring cup. Using a Brookfield RVT viscometer with a No. 5 spindle at 20 rpm, the gel time is determined by measuring the time required to reach 20,000 cps. The spindle is removed, wiped and rinsed with a solvent and the reaction is observed to completion. The amount of foam rise is measured and recorded to the nearest 1/8 of an inch.

Unfilled urethane foam and foams filled with calcium carbonate or conventional ATH were evaluated to illustrate the effect a filler has on gel time and foam rise. These are reported as Examples 1–4 in Table 1.

In examples 5–11, a series of ATH fillers made according to the previously discussed method and using a 2% by weight surface coating of the indicated premix were evaluated.

TABLE 1

| Test # | Particle Size (um) | Crude | Surface Treatment | Soluble Soda (Wt. %) | Free Moisture (Wt. %) | Gel Time Min. | Foam Rise | Days Aged |
|---|---|---|---|---|---|---|---|---|
| 1 | — | — | Unfilled Urethane | — | — | 46.08 | $\frac{1}{4}''$ | — |
| 2 | | CaCO$_3$ | none | .000 | | 17.04 | $\frac{1}{8}''$ | — |
| 3 | | CaCO$_3$ | 70% Polyol/ 30% TDI | .000 | | 13.04 | $\frac{1}{4}''$ | — |
| 4 | 25 | ATH Batch #1 | none | .016 | .21 | 10.22 | $\frac{1}{2}''$ | 2 |
| 5 | " | " | TDI | .021 | .25 | 11.48 | $\frac{1}{2}''$ | 2 |
| 6 | " | " | Polyol | .021 | .25 | 8.41 | $\frac{1}{2}''$ | 2 |
| 7 | " | " | 70% Polyol/ 30% TDI | .026 | .21 | 10.50 | $\frac{1}{2}''$ | 2 |
| 8 | " | " | " | — | — | 11.11 | $\frac{1}{2}''$ | 7 |
| 9 | " | " | " | — | — | 10.51 | $\frac{1}{2}''$ | 7[1] |
| 10 | " | " | 30% Polyol/ 70% TDI | — | — | 11.30 | $\frac{3}{4}''$ | 2 |
| 11 | " | " | " | — | — | 10.03 | $\frac{3}{4}''$ | 2[1] |

[1]Aged 2 hrs. at 150° F. prior to testing

ATH which was surface treated with a polyfunctional isocyanate, alone or in conjunction with a polyol, exhibited decreases in surface activity as reflected by increased gel time and excess foam suppression. Surface treatment with polyol alone (example 6) produced no reduction in surface activity. surface treatment with TDI alone (Example 5) produced the greatest reduction in surface activity. Surface treatment with a premix containing both polyol and TDI tended to be more effective as the percentage of TDI in the premix increased.

In Examples 12–15, Table 2, a series of flame retardant mineral fillers were made according to the previously discussed method but using less coarse(18–20 μm) ATH and evaluated. Again toluene diisocyanate (T-80) was selected as the polyfunctional isocyanate. All loading levels were 2% by weight of filler. This less coarse (18–20 μm) particulate filler was made from a mixed source crude (Batch 2) which had a soluble soda approximately the same as Batch 1.

TABLE 2

| Test # | Size (um) | Crude | Surface Treatment | Soluble Soda | Free Moisture | Gel Time | Foam Rise | Days Aged |
|---|---|---|---|---|---|---|---|---|
| 12 | 18–20 | Batch #2 ATH | none | .022 | .28 | 8.14 | >1" | 0 |
| 13 | " | " | 70% Polyol/ 30% TDI | .020 | .25 | 7.49 | ¾" | 2 |
| 14 | " | " | TDI | .017 | .31 | 11.38 | ¼" | 2 |
| 15 | " | " | Polyol | .021 | .18 | 7.59 | ¾" | 2 |

Example 12 teaches that in the absence of the surface treatment of the present invention, a gel time and foam rise was unacceptable for commercial applications even though the crude soluble soda level was very similar to that of Batch 1. The decrease in particle size, and therefore the increase in surface area with a concommit increase in surface activity, is believed responsible.

Example 13 indicates that a surface treatment with a premix of 70% polyol and 30% TDI was inadequate to produce an acceptable filler even though a similar premix surface treatment on a larger particle size ATH (Example 7) was acceptable. However, in Example 14 the filler surface treated with TDI alone produced excellent results. This suggests that a polyol/TDI premix is adequate to reduce surface activity if the polyfunctional isocyanate content is adequate to block most of the active sites. Examples 6 and 15 illustrate that surface treatment with a polyol which alone does not react with the active site on the filler surface, does not reduce the surface activity of the ATH.

Table 3 illustrates a coarse particle size filler of the present invention made from Batch No. 1 crude using different polyfunctional isocyanate surface treatments. In each case 2% by weight polyfunctional isocyanate was used as a surface treatment.

TABLE 3

| Test # | Size (um) | Crude | Surface Treatment | Gel Time | Foam Rise | Days Aged |
|---|---|---|---|---|---|---|
| 16 | 25 | Batch #1 | none | 11.01 | ¾" | 1 |
| 17 | " | " | T-7000 | 11.55 | ¼" | 1 |
| 18 | " | " | T-80 | 11.34 | ¼" | 1 |
| 19 | " | " | MDI | 14.31 | ¼" | 1 |
| 20 | " | " | MDI | 14.89 | ¼" | 29 |
| 21 | " | Batch #2 | none | 11.30 | ¾" | 1 |
| 22 | " | " | T-7000 | 12.11 | ¼" | 1 |
| 23 | " | " | T-80 | 14.62 | ¼" | 1 |
| 24 | " | " | MDI | 15.21 | ¼" | 1 |
| 25 | " | " | T-80 | 16.07 | ¼" | 29 |
| 26 | " | Batch #3 | none | 10.23 | ¼" | 1 |
| 27 | " | " | T-7000 | 12.18 | ¼" | 1 |
| 28 | " | " | T-80 | 15.64 | ¼" | 1 |
| 29 | " | " | MDI | 17.29 | ⅛" | 1 |

It can be seen that each of the polyfunctional isocyanates illustrated provided a substantial increase in gel time and reduction in foam rise as compared to the material without surface treatment. Example 20 and 25 teaches that aging does not impair the reduced activity filler even after the treated sample had been stored for 29 days.

Examples 30–37, Table 4, compares treated and untreated ATH in different particle sizes. The filler was produced by the method previously described. The polyfunctional isocyanate used was MDI at 2.5% by weight filler.

TABLE 4

| Test # | Size (um) | Crude | Surface Treatment | Gel Time | Foam Rise | Days Aged |
|---|---|---|---|---|---|---|
| 30 | 18–20 | Batch #2 | none | 9.78 | ¾" | 1 |
| 31 | 18–20 | " | MDI | 10.87 | ¾" | 1 |
| 32 | 10 um | " | none | 9.80 | ¾" | 1 |
| 33 | 10 um | " | MDI | 12.20 | ¾" | 1 |
| 34 | 8 um | " | none | 9.04 | >1" | 1 |
| 35 | 8 um | " | MDI | 8.80 | >1" | 1 |
| 36 | 2 um | " | none | 6.73 | >1" | 1 |
| 37 | 2 um | " | MDI | 7.02 | >1" | 1 |

With a particle size of 18 to 20microns, the untreated ATH was unacceptable (Example 30) but with the surface treatment of the present invention the material was made acceptable (Example 33). Even with a medium (10 microns) particle size hydrated filler, the surface treatment of the present invention was able to reduce the surface activity to acceptable levels. It was not until finer particle size fillers were evaluated (8 micron and 2 micron) did the 2.5% surface treatment of the present invention prove inadequate.

It is presently believed that Examples 35 and 37 failed because 2.5% by weight polyfunctional isocyanate was not sufficient to react with all available active sites given the substantial increase in surface areas of the finer particle size. It is believed that up to about 5% by weight surface treatment could be used without agglomerating the filler and still produce a dry free-flowing powder flame retardant. This may be sufficient to compensate for the substantial increase in surface area.

It is well known that using smaller particle size filler enhances some physical properties of the polymer matrix. Previously, only coarser ATH flame retardants have been acceptable in urethane foam applications because of surface activity limitations. A commercially acceptable, finer particle size ATH would provide increased flexibility in choosing the optimal characteristics of the final polymer composite.

In Examples 38–55, Table 5, a coarse (25 micron) ATH filler was made by the previously discussed method using a more typically available crude ATH (Batch #4) with an isocyanate loading of 2%. These examples were aged from 0–7 days and then placed in a polyol preblend. The surface activity of coarse ground ATH varies from 0.012% to 0.02% soluble soda. The ground ATH from Batch 4 had a soluble soda which would have been unacceptable for use in urethane foam applications without either the surface treatment of the present invention or perhaps excessive aging.

TABLE 5

| Test # | Crude | Surface Treatment | Gel Time | Foam Rise | Posttreat Aged | Heat Aged | Hrs. in Polyol Preblend |
|---|---|---|---|---|---|---|---|
| 38 | Batch #4 | none | 8.75 | ⅞" | 0 | No | No |
| 39 | " | T-80 | 14.61 | ½" | 1 | No | No |
| 40 | " | MDI | 18.72 | ⅛" | 0 | No | No |

TABLE 5-continued

| Test # | Crude | Surface Treatment | Gel Time | Foam Rise | Posttreat Aged | Heat Aged | Hrs. in Polyol Preblend |
|---|---|---|---|---|---|---|---|
| 41 | " | MDI | 20.42 | ¼" | 1 | No | No |
| 42 | " | MDI | 19.88 | ¼" | 2 | No | No |
| 43 | " | MDI | 18.53 | ⅜" | 0 | No | No |
| 44 | " | MDI | 13.82 | ⅜" | 1 | No | 24 |
| 45 | " | MDI | 13.74 | ⅜" | 2 | No | 48 |
| 46 | " | MDI | 12.39 | ¼" | 3 | No | 72 |
| 47 | " | MDI | 11.00 | ¾" | 4 | No | 96 |
| 48 | " | MDI | 12.41 | ¼" | 3 | 24 hrs. | 72 |
| 49 | " | MDI | 11.20 | ¾" | 4 | 48 hrs. | 96 |
| 50 | " | MDI | 13.16 | ¼" | 4 | No | |
| 51 | " | MDI | 11.72 | ¼" | 7 | No | 72 |
| 52 | " | MDI | 13.78 | ¼" | 7 | 72 hrs. | 72 |
| 53 | " | none | 10.58 | ⅞" | 4 | No | |
| 54 | " | none | 11.95 | ¼" | 7 | No | 72 |
| 55 | " | none | 13.28 | ¾" | 7 | 72 hrs. | 72 |

Examples 38 and 53 illustrate untreated material having unacceptable gel time and foam rise. It was not until the untreated mineral filler produced from Batch 4 crude had been aged for 7 days (Example 54 and 55) did the filler performed acceptably. In contrast, filler of the present invention performed acceptably without aging. It is commercially impractical to age mineral flame retardant for such periods before it can be used. In addition, Table 5 illustrates that the polymer surface coating is highly stable and is not removed or significantly degraded even after 96 hours in a polyol master batch preblend.

A coarse ground (25 μm) ATH treated with 2% MDI according to the teachings of the present invention was compared to conventional coarse ground ATH in a laboratory scale urethane foam carpet backing machine and production working time measured. The conventional ATH had a working time of 2.5 minutes while the ATH retardant filler of the present invention had a working time of 3.25 minutes. This represents a 30% increase in working time.

Physical data from the urethane foam produced above showed an improvement in tear strength, an improvement in tensile strength, an improvement in compression resistance and a significant improvement in compression set. The test for compression set consists of compressing a 1-inch foam sample to 50% of its height for 22 hours at 70° C. to measure creep. After 22 hours the compression load is removed and the height of the sample measured. The difference between the compressed height and the original height of the sample is measured and expressed as a percent of the original height. A compression set of 15, i.e. the sample returns to 85% of it's original height, is considered to be good. The product of the present invention had a compression set of 10 as compared to a urethane foam prepared from a conventional commercially available ATH flame retardant sample which had a compression set of 30.

It is understood that only preferred embodiments of the present invention have been described and that numerous substitutions, alterations and modifications are all permissible without departing from the spirit and scope of the invention.

We claim:

1. A particulate fire retardant compositions comprising:
    a particulate alumina trihydrate mineral filler; and
    a polymeric material formed from a polyfunctional isocyanate, said polymeric material being present in an amount sufficient to coat said particulate filler without substantially agglomerating said particulate filler, said particulate filler containing an initiator in an amount sufficient to effect reaction polymerization of said polyfunctional isocyanate.

2. The flame retardant composition of claim 1, wherein the polyfunctional isocyanate is selected from the group consisting of toluene diisocyanate, diphenylmethane diisocyanate, hexamethylene diisocyanate, isophorone diisocyanate, and mixtures and prepolymers thereof.

3. The flame retardant composition of claim 1, wherein the polyfunctional isocyanate is present in an amount substantially between 0.25% to 5% by weight of the particulate mineral filler.

4. The flame retardant composition of claim 1 wherein the polyfunctional isocyanate is present in an amount substantial between 2% to 2.5% by weight of the particulate mineral filler.

5. The flame retardant composition of claim 1, wherein the polymeric material is formed from a polyfunctional diisocyanate and a polyol.

6. The flame retardant composition of claim 1 wherein the initiator is sites of basic alkali metal salts on the surface of the particulate filler, the sites sufficient in amount to effect polymerization of the polyfunctional isocyanate.

7. A flame retardant polymer foam composition comprising:
    a polyurethane foam material formed from the reaction of an isocyanate and a polyol, said material containing suspended therein an amount of the particulate flame retardant of claim 11 effective to reduce the flamability of the polyurethane foam material.

8. The flame retardant composition of claim 1 wherein the initiator includes a catalyst effective to initiate polymerization of the isocyanate.

9. The flame retardant composition of claim 1 wherein the polymeric material is formed from the autopolymerization of one or more polyfunctional isocyanates.

10. A particulate fire retardant composition comprising:
    a particulate alumina trihydrate mineral filler having coated thereon a polymeric reaction product formed from a polyfunctional isocyanate in an amount insufficient to substantially agglomerate said filler said polymeric reaction product at least partially initiated by sites of basic alkali metal salts on the surface of the particulate filler.

11. The particulate fire retardant composition of claim 1 wherein the polymeric reaction product is present in an amount substantially between 0.25% to 5% by weight of the particulate filler.

12. The fire retardant composition of claim 11 wherein the polymeric reaction product is formed from the reaction of one or more polyfunctional isocyanates with itself.

13. The fire retardant composition of claim 11 wherein the polymeric reaction product is formed from the reaction of a polyfunctional isocyanate with a polyol.

14. The fire retardant composition of claim 10 wherein the polyfunctional isocyanate is selected from the group consisting of toluene diisocyanate, diphenylmethane diisocyanate, hexamethylene diisocyanate, isophorone diisocyanate, and mixtures and prepolymers thereof.

15. A flame retarded polymer resin composition comprising:
a polymer resin having suspended thereon an amount of the particulate fire retardant composition of claim 1 sufficient to reduce the flammability of said polymer resin.

* * * * *